US005606944A

United States Patent [19]

Kurihara

[11] Patent Number: 5,606,944

[45] Date of Patent: Mar. 4, 1997

[54] INTERNAL COMBUSTION ENGINE

[75] Inventor: Katumi Kurihara, Nagoya, Japan

[73] Assignee: Ryobi Limited, Hiroshima-Ken, Japan

[21] Appl. No.: 618,316

[22] Filed: Mar. 19, 1996

Related U.S. Application Data

[62] Division of Ser. No. 52,381, Apr. 23, 1993, abandoned.

[51] Int. Cl.[6] .......... F02B 75/32; A01D 34/02

[52] U.S. Cl. .......... 123/90.31; 123/197.1; 123/196 W; 123/195 HC; 56/17.5

[58] Field of Search .......... 123/197.1, 196 W, 123/195 HC, 90.31; 56/DIG. 6, 14.7, 17.5

[56] References Cited

U.S. PATENT DOCUMENTS

| | | | |
|---|---|---|---|
| 4,583,504 | 4/1986 | Morris | 123/90.31 |
| 5,176,116 | 1/1993 | Imagawa et al. | 123/196 W |
| 5,226,284 | 7/1993 | Meehleder | 56/17.5 |

*Primary Examiner*—Weilun Lo
*Attorney, Agent, or Firm*—Brooks & Kushman P.C.

[57] ABSTRACT

An internal combustion engine comprises a vertical crankshaft rotatable in a crankcase, a piston reciprocable along a cylinder axis, and a push rod tube. The push rod tube communicates between the crankcase and a rocker box, and is positioned below the cylinder axis and upwardly inclined with respect to the cylinder axis. A cam gear agitates oil in the crankcase so that the oil is conveyed through the push rod tube into the rocker box and returns through the push rod tube to the crankcase under the force of gravity. In another embodiment, the engine comprises a crankshaft having an arcuate throw and a crankpin. A connecting rod has a continuously formed big end installable over the arcuate throw to cooperate with the crankpin. A flywheel is mounted to the crankshaft on a side of the crank pin opposite a balancing web, and has a radially offset center of gravity to balance forces applied to the crankshaft through the connecting rod by the piston. In another embodiment, a four cycle engine drives a cutting blade to form a vegetation cutting device. The four cycle engine includes a piston reciprocable in a block, a crankshaft rotatable by the piston, and a camshaft journaled to the block and rotatable by the crankshaft at one half the rate of rotation of the crankshaft. The cutting blade is driven by an outer portion of the camshaft which extends externally of the block. Another embodiment of the invention is an engine which runs on an alternative fuel such as propane.

7 Claims, 12 Drawing Sheets

Fig. 14
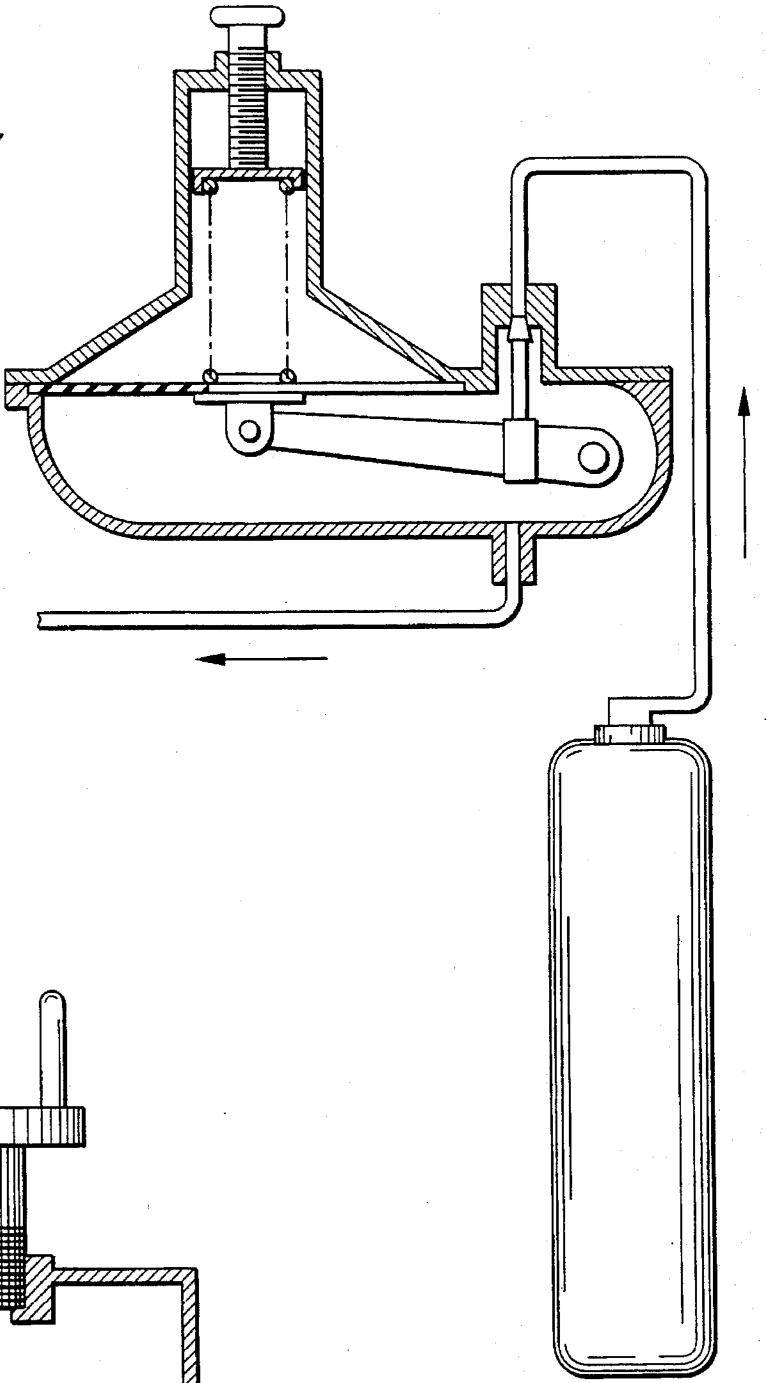
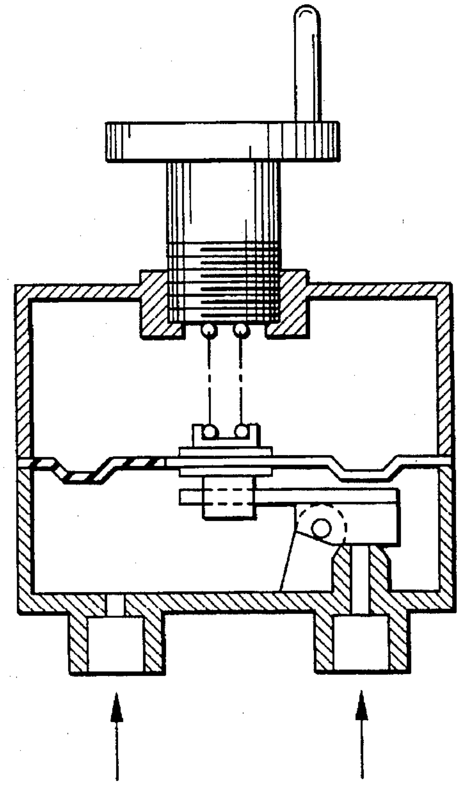
Fig. 15

INTERNAL COMBUSTION ENGINE

This is divisional of application Ser. No. 08/052,381 filed on Apr. 23, 1993, now abandoned.

TECHNICAL FIELD

This invention relates to internal combustion engines, and more particularly to a one cylinder, four-cycle internal combustion engine having a vertical crankshaft.

BACKGROUND ART

One cylinder internal combustion engines are used in a wide variety of applications, including lawn mowers and hand held power tools. In many of these applications, a piston reciprocable in a horizontally oriented cylinder drives a vertically oriented crankshaft. In the case of a four stroke engine having a vertical crankshaft, the intake and exhaust valves may be located to the side of the cylinder. In this side valve or flat face arrangement, the camshaft is usually located at the side of the crankshaft, with the push rods located in the same general horizontal plane in which the piston reciprocates.

Another conventional four cycle engine design utilizes overhead valves located in the cylinder head. Typically, the two push rods in this design are located one on top of the other at the side of the cylinder. Lubricating oil from the crankcase is pumped or otherwise directed to the valve train components housed in a rocker box at one end of the push rods, and returns to the crankcase through a return path located under the cylinder. A variation of this design is disclosed in U.S. Pat. No. 4,881,496 to Kronich, in which oil is directed through the upper push rod tube to the rocker box, and returns to the crankcase through the lower push rod tube.

Another prevalent feature of conventional small engines is that the crankshaft is usually supported in the crankcase on both sides of the cylinder axis. In one variation of this design, the crankshaft is integrally formed with two webs, between which a cracked connecting rod is assembled to the crankshaft with a bearing. This construction is expensive to make and assemble, and also presents difficulty in lubricating the connecting rod bearing by splash lubrication. In another variation of this design the crankshaft is formed from several discrete components. The lower end of the connecting rod is fit onto a crankpin, which is thereafter built up with the remainder of the crankshaft. While the connecting rod bearing is generally easier to lubricate in this construction, the engine as a whole is no less expensive to make or assemble.

It is recognized that overhead valve engines produce less harmful emissions than side valve engines. However, many overhead valve engines operate with approximately 20–30% higher mean effective pressure than side valve engines, and have approximately a 10–30% higher mean piston speed where the mean effective pressure is the highest. This means that an overhead valve engine can produce the same power with better thermal efficiency, lower piston displacement, and less weight than an equivalvent side valve engine.

Although naturally aspirated overhead valve engines are most efficient when operating at a mean piston speed of about 4–10 meters per second, the resulting crankshaft speed is impractical to use in many applications such as driving the cutting blade of a lawnmower. One solution to this problem is proposed by U.S. Pat. No. 4,583,504 to Morris, which shows a lawn mower gear reduction system including a crankshaft and crankgear which drive an output gear and an output shaft. The output gear drives a camshaft, while the output shaft drives a lawnmower blade at a lower speed than the speed at which the crankshaft revolves.

It is also recognized that internal combustion engines can be adapted to run on alternative fuels, such as liquified petroleum gasses, that produce less emissions than conventional fuels like gasoline or diesel fuel. In a typical alternative fuel engine, the liquified gas is sent from a gas bomb through a filter in the liquid state, and at least partially vaporizes upon entry through a lock valve into a vaporizer. Because the liquified fuel absorbs heat from the surroundings when it changes states, however, some provision must be made to prevent the effects of this vaporization, such as the formation of ice, from interfering with the operation of the engine.

This is normally accomplished by diverting a portion of the engine coolant to the parts of the engine that require warmth. U.S. Pat. No. 4,335,697 to McLean, for instance, discloses a system in which the liquified petroleum gaseous fuel tank and the line supplying the fuel to the carburetor are maintained at a constant temperature via a by-pass of the engine coolant circuit. This approach is not feasible in small engines, however, which are predominantly air cooled as opposed to water cooled.

A further problem frequently found in conventional internal combustion engine powered garden tools such as lawn mowers is that the air used to cool the engine is exhausted out the lower part of the engine. For example, U.S. Pat. No. 4,890,584 to Tamba et al. discloses an engine having a vertical crankshaft in which a cooling fan is fixed with a flywheel to an output shaft below the engine body. Cooling air is drawn over the engine, and is discharged from openings below the engine. The cooling air discharged in this manner may stir up soil or gravel lying on the ground around which the garden tool is operating, and may also interfere with the collection of clippings produced by a lawn mower or line trimmer.

SUMMARY OF THE INVENTION

The present invention is an internal combustion engine comprising a generally vertically oriented crankshaft rotatable in a crankcase, a piston reciprocable along a generally horizontal cylinder axis and operatively connected to the crankshaft to impart rotation to the crankshaft, and a push rod tube. The push rod tube is in communication between the crankcase and a rocker box, and is positioned generally below the cylinder axis and upwardly inclined about 10 degrees with respect to the cylinder axis. A cam gear agitates oil in the crankcase so that the oil is conveyed through the push rod tube into the rocker box and returns through the push rod tube to the crankcase under the force of gravity.

In another embodiment of the invention, the internal combustion engine comprises a piston, a crankshaft having an arcuate throw and a crankpin, a connecting rod, a balancing web, and a flywheel. The connecting rod has a small end operatively connected to the piston and a continuously formed big end installable over the arcuate throw to cooperate with the crankpin. The flywheel is mounted to the crankshaft on the side of the crank pin opposite the balancing web, and has a radially offset center of gravity to balance forces applied to the crankshaft through the connecting rod by the piston.

In another embodiment of the invention, a four cycle engine drives a cutting blade to form a vegetation cutting device. The four cycle engine includes a piston reciprocable in a block, a crankshaft rotatable by the piston, and a camshaft journaled to the block and rotatable by the crankshaft at one half the rate of rotation of the crankshaft. The cutting blade is driven by an outer portion of the camshaft which extends externally of the block.

Another embodiment of the invention is a portable, lightweight four cycle air cooled internal combustion engine which runs on an alternative fuel such as propane or butane. The engine comprises an engine block including a crankcase and a cylinder, a pressure vessel containing the fuel mounted adjacent the engine block, a vaporizer, regulator means and a fan. The vaporizer is mounted adjacent the engine block in communication with the pressure vessel, and the regulator means regulates the flow of the fuel between the pressure vessel and the cylinder. The fan is also mounted adjacent the engine block, and circulates air over the engine block and directs the heated air against the pressure vessel and the vaporizer to counteract cooling due to the latent heat at vaporization of the fuel.

Accordingly, it is an object of the present invention to provide an internal combustion engine of the type described above in which oil is circulated more efficiently than in prior art designs.

Another object of the present invention is to provide an internal combustion engine of the type described above having a weight embedded in a flywheel for balancing the forces applied to the crankshaft by the connecting rod.

Another object of the present invention is to provide an internal combustion engine of the type described above in which cooling air circulating around the engine is directed generally upwardly.

Another object of the present invention is to provide an internal combustion engine of the type described above having a cooling fan mounted on the crankshaft generally below a horizontally oriented cylinder.

Another object of the present invention is to provide an internal comustion engine of the type described above having a camshaft which drives a workpiece such as the cutting blade of a lawnmower.

Another object of the present invention is to provide an internal combustion engine of the type described above which is operable on an alternative fuel such as compressed propane.

Another object of the present invention is to provide an internal combustion engine of the type described above which uses the heated air circulating over the engine to counteract the cooling effects of the latent heat of evaporation of an alternative fuel consumed by the engine.

Another object of the present invention is to provide an internal combustion engine of the type described above which has relatively low emissions.

A more specific object of the present invention is to provide an internal combustion engine of the type described above which has a relatively light weight.

Another specific object of the present invention is to provide a vegetation cutting device such as a lawnmower or line trimmer which utilizes an internal combustion engine having one or more of the features disclosed herein.

These and other objects, features, and advantages of the present invention are readily apparent from the following detailed description of the best mode for carrying out the invention when taken in conjunction with the accompanying drawings.

BRIEF DESCRIPTION OF THE DRAWINGS

FIG. 14 is a cross-sectional view of a pressure regulator of the type used in the embodiment shown in FIGS. 12 and 13; and FIG. 15 is a cross-sectional view of a fuel flow regulator of the type used in the embodiment shown in FIGS. 12 and 13.

BEST MODE FOR CARRYING OUT THE INVENTION

With reference to the drawings, the preferred embodiments of the present invention will be described.

Figure 1:
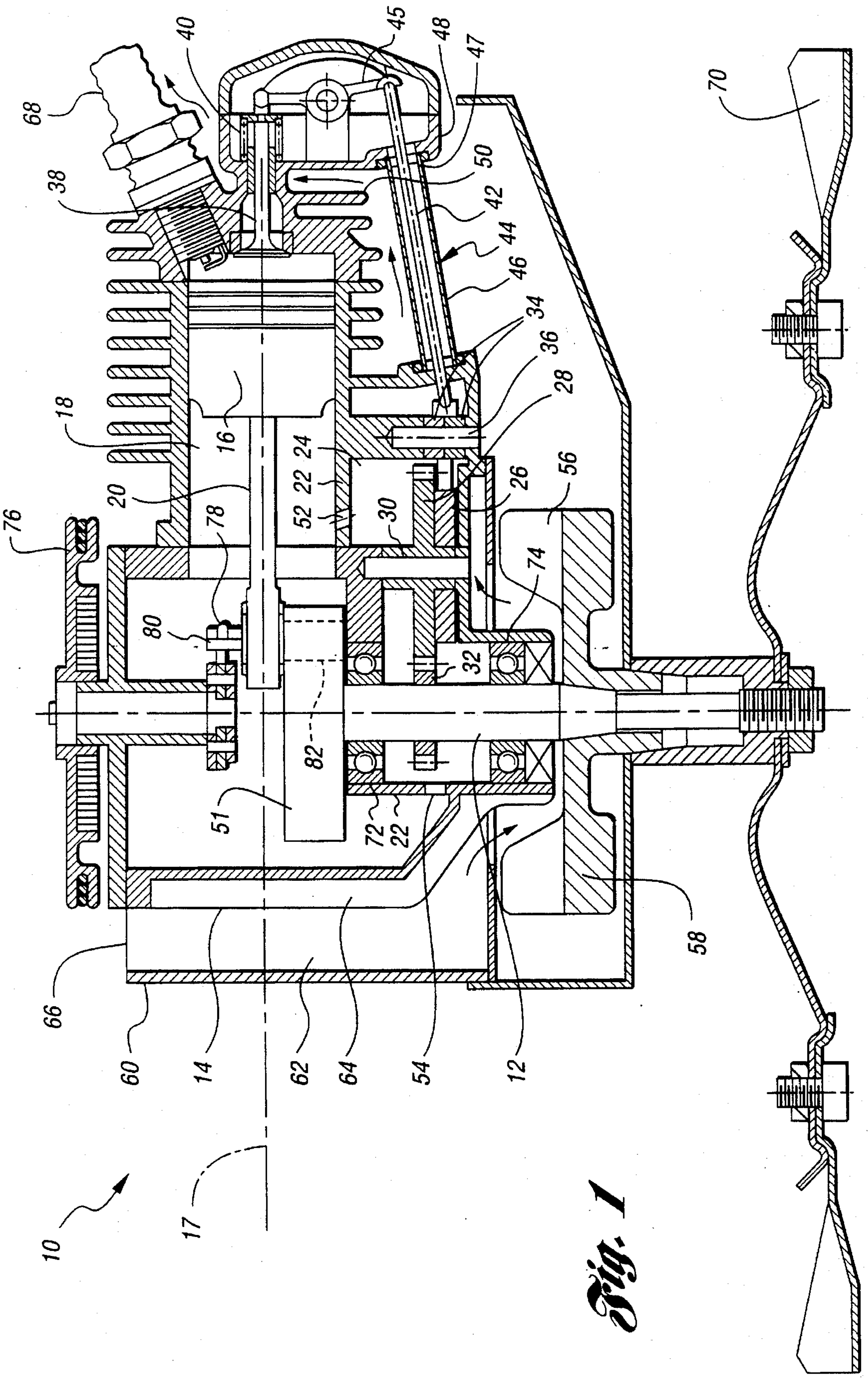
FIG. 1 is a cross-sectional view of a small internal combustion engine according to one embodiment of the present invention.

FIG. 1 shows a four cycle, one cylinder engine 10 which is advantageously dedicated, for example, to run a rotary power lawn mower. The engine 10 includes a generally vertically oriented crankshaft 12 rotatable in an aluminum or aluminum alloy crankcase 14, and a piston 16 reciprocable along a cylinder axis indicated by the dashed line 17 in a generally horizontally oriented cylinder 18. The piston 16 is operatively connected to the crankshaft 12 through a connecting rod 20 to impart rotation to the crankshaft, as is well known. A wall 22 extends at least partially into the crankcase 12 to define an oil collection or cam chamber 24.

A single cam lobe 26 and a cam gear 28 are mounted in the oil collection chamber 24 on a camshaft 30, which in turn is rotatably mounted in the crankcase 14. The cam gear 28 meshes with and is rotated by a crankgear 32 mounted on the crankshaft 12 to rotate the camshaft 30 at one-half the speed at which the crankshaft rotates. A pair of cam followers 34 are pivotably mounted on a follower shaft 36, which extends generally parallel to the camshaft 30 and is fixedly mounted in the crankcase 14. The followers 34 thus pivot on the follower shaft 36 in well known fashion as the cam lobe 26 rotates.

An intake valve 38 and an exhaust valve (not shown) are normally biased to a seated or closed position by springs 40. As the followers 34 pivot on the follower shaft 36, they respectively reciprocate push rods 42 disposed in push rod covers or tubes 44. The push rods 42 extend up to and cooperate with rocker arms 45, which alternately actuate the intake valve 38 and the exhaust valve, respectively, to conventionally supply a fuel-air mixture to the cylinder 18 and to evacuate the byproducts of combustion from the cylinder.

The push rod tubes 44 are positioned generally below the cylinder 18, and have a first end 46 in communication with the oil collection chamber 24 of the crankcase 14 and a second end 47 in communication with a rocker box 48 mounted on a cylinder head 50. The push rod tubes 44 are upwardly inclined at least about 10 degrees with respect to the cylinder axis and the horizontal plane, with the end 46 closer to the oil collection chamber 24 being lower than the opposite end 47 adjacent the rocker box 48.

The oil collection chamber 24 functions as a sump into which lubricating oil circulating through the engine 10 drains. The oil is preferably filled to a level about the even with the cam lobe 26 before the engine is operated. After the engine is started, the oil level in the crankcase may rise to intermittently touch the crank web 51. The wall 22 which defines the oil collection chamber 24 has at least two apertures 52 and 54 through which the oil collection chamber and the crankcase 14 are in communication. The aperture 52 is preferably angled to direct the oil passing therethrough toward the interface of the connecting rod 20 and the crankshaft 12. The rotating cam lobe 26 and cam gear 28 function as a means for agitating the oil in the oil collection chamber 24 so that an oil mist is created. Because the cam lobe 26 has a diameter smaller than that of the cam gear 28, there is less dissipation of power and less heating of the oil due to shaking lubricating oil.

The oil mist is conveyed through the apertures 52 and 54 into the crankcase 14, with the apertures preferably sized to meter the supply of oil passing therethrough. The oil mist is also conveyed through the push rod tubes 44 into the rocker box 48 to lubricate and cool the valve train and the aluminum or aluminum alloy cylinder head 50. Because the push rod tubes 44 are inclined and located below the cylinder 18 and mostly below the lowermost point in the rocker box 48, the oil returns through the push rod tubes 44 to the oil collection chamber 24 under the force of gravity alone after it liquifies. At least a portion of the liquid oil thus returns to the crankcase easily via the push rod tubes without the provision of any additional passages.

A cooling fan 56 is rotatably mounted with a flywheel 58 to the lower end of the crankshaft 12 generally below the cylinder 18. The crankcase 14 is at least partially enclosed in a housing 60 to define an air passage 62 between the housing 60 and cooling fins 64 located around the outside of the crankcase 14, the cylinder 18, and the cylinder head 50. The cooling fan 56 draws air through inlets 66 in the housing 60, and directs the cooling air over the hot areas of the engine 10 and then generally upwardly as shown by the arrows to exit through one or more outlets around the cylinder 18 and near sparkplug 68. The circulating cooling air thus does not interfere with the clippings discharged by, for example, a lawn mower blade 70 mounted to the lower end of the crankshaft 12.

The crankshaft 12 is preferably cantilevered as described in U.S. Pat. No. 4,342,236, hereby incorporated by reference. The crankshaft 12 has a first lower end rotatably supported in bearings 72 and 74 mounted in the crankcase 14, and a second free end which is operatively connected to the connecting rod 20 but is otherwise unsupported. A recoil starter 76 of the on-off type is located at the side of the crankshaft opposite the cutting blade 70. A one-way hook 78 engages a nail 80 projecting from a pin 82 to initially rotate crankshaft 12 when the recoil starter rope is pulled, and thereby start the engine 10 operating under its own power. After the engine starts, the hook 78 disconnects from the nail 80.

Figure 2:
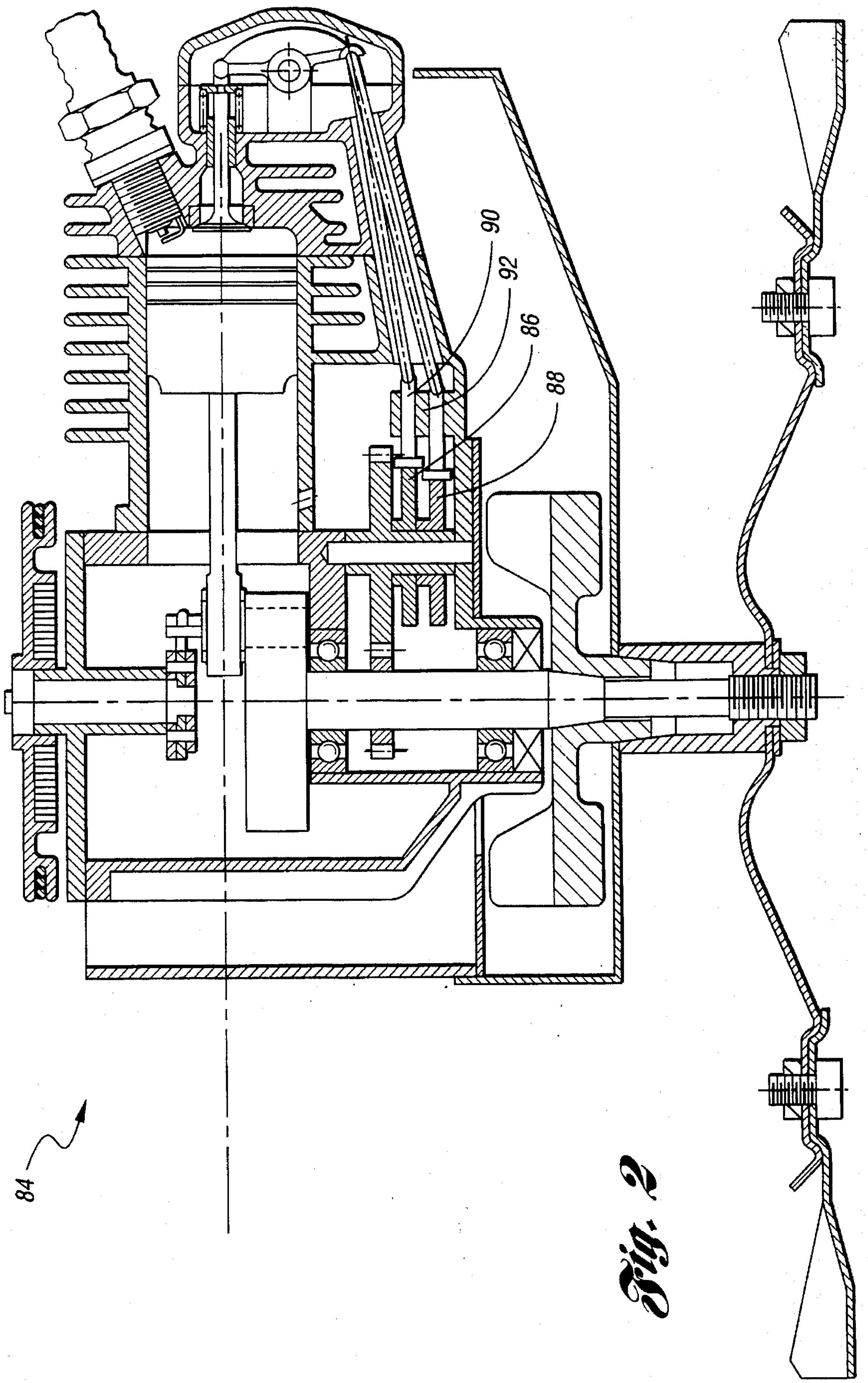
FIG. 2 is a cross-sectional view of an alternative embodiment of the internal combustion engine.

FIG. 2 shows an alternative embodiment 84 of the engine. This embodiment operates in substantially the same manner as the embodiment shown in FIG. 1, except that two conventional cams 86 and 88 and corresponding tappets 90 and 92 are substituted for the cam followers shown in FIG. 1.

Figure 3:
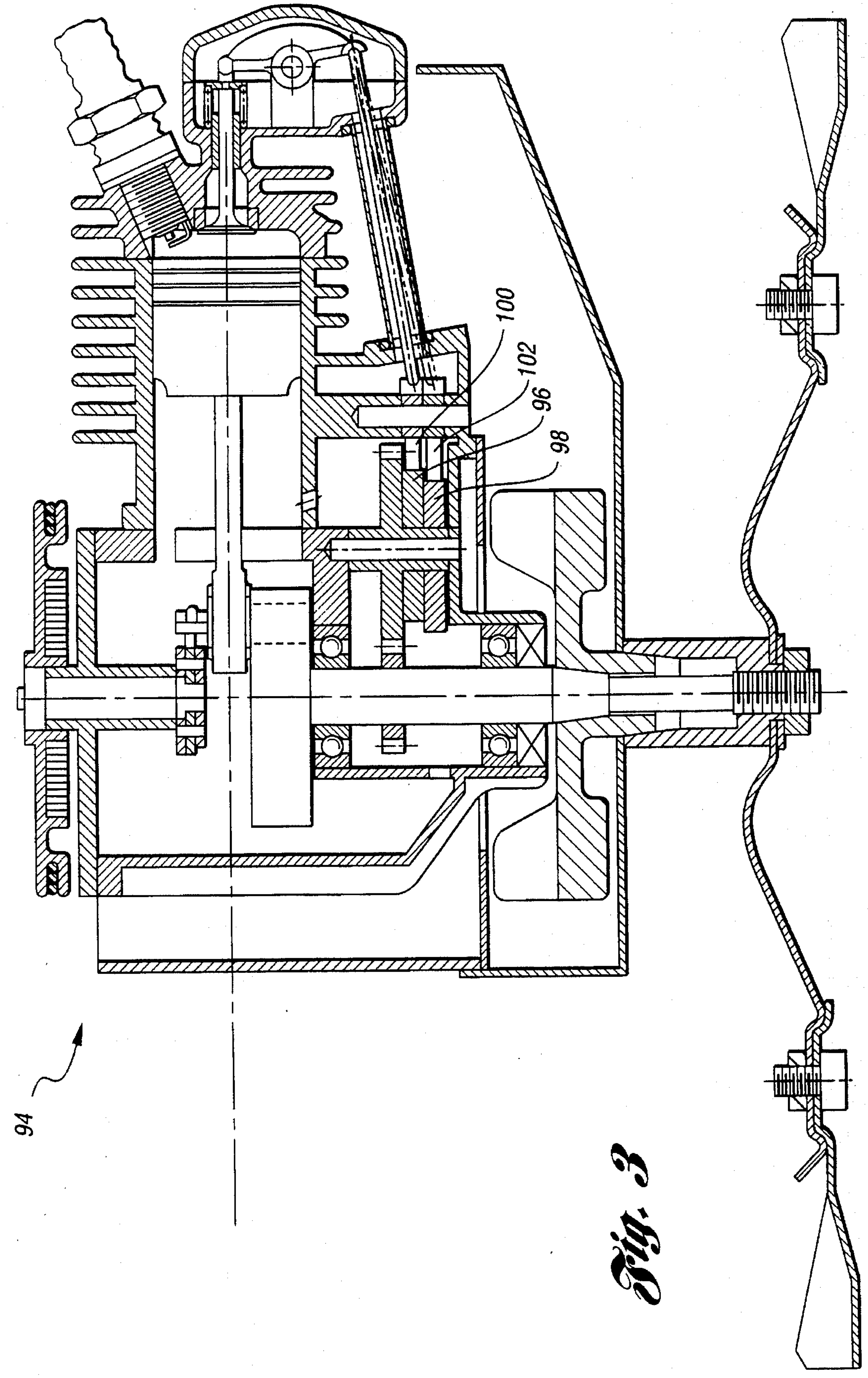
FIG. 3 is a cross-sectional view of another alternative embodiment of the internal combustion engine.

FIG. 3 shows another alternative embodiment 94 of the engine. This embodiment also operates in substantially the same manner as the previously described embodiments, except that two cams 96 and 98 and cam followers 100 and 102 similar to the cam followers shown in FIG. 1 function to translate the rotational movement of the cams to reciprocable movement of the push rods.

Figure 4:
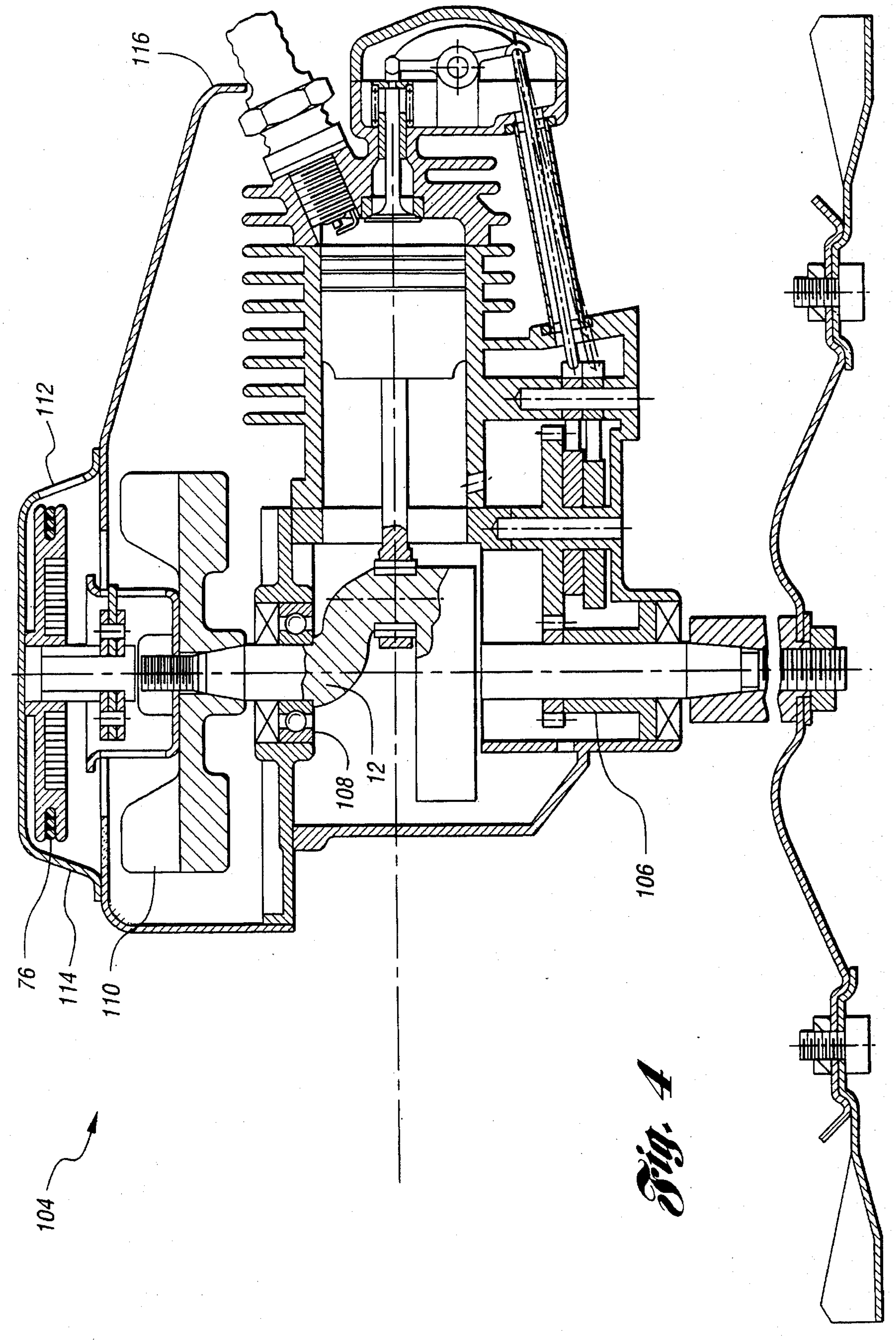
FIG. 4 is a cross-sectional view of another alternative embodiment of the internal combustion engine.

FIG. 4 shows another alternative embodiment 104 of the engine which again operates in substantially the same manner as the previously described embodiments, with the exception that two bearings 106 and 108 on opposite sides of the cylinder axis support the crankshaft 12. Also, a cooling fan 110 is mounted to the upper end of the crankshaft, generally between the cylinder 18 and the starter 76 so that air is directed from inlets 112 in shroud 114 and out through outlets 116.

Figures 5, 6:
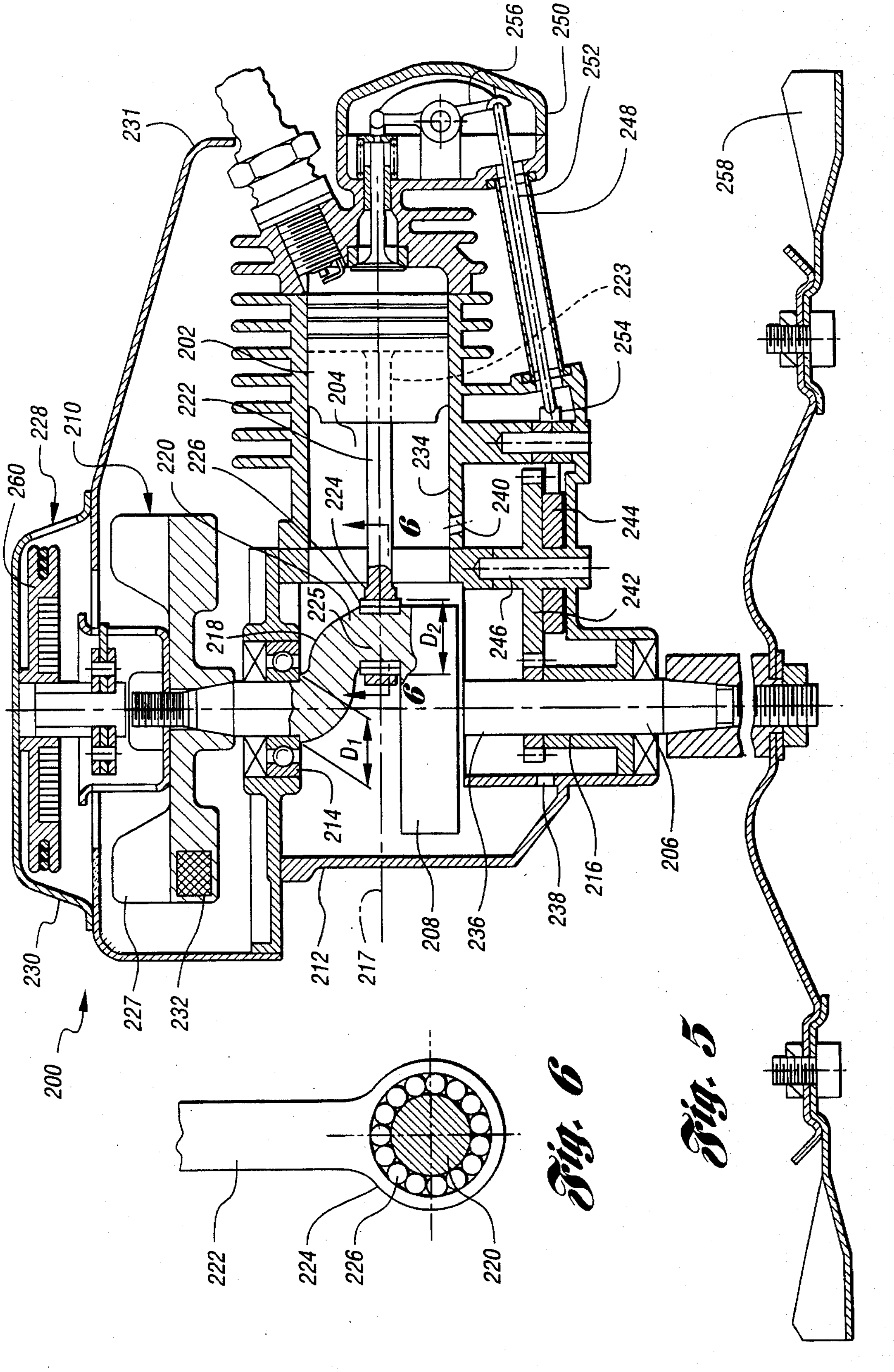
FIG. 5 is a cross-sectional view of another alternative embodiment of the internal combustion engine.
FIG. 6 is a cross-sectional view taken along line 6—6 in FIG. 5.

FIG. 5 shows another alternative embodiment 200 of the internal combustion engine comprising a piston 202 reciprocable in a generally horizontally oriented cylinder 204, a vertical crankshaft 206 including a single balancing web or counterweight 208, and a flywheel 210 mounted to the upper end of the crankshaft 206.

The crankshaft 206 is rotatably mounted in a crankcase 212 by bearings 214 and 216 located on either side of the cylinder axis indicated by the dashed line 217. The crankshaft 206 includes an arcuate throw 218 and a crankpin 220 connected to the balancing weight 208. A connecting rod 222 has a small end 223 operatively connected to the piston 202 and a continuously formed big end 224 operatively connected to the crankpin 220 at a connection point 225 within the crankcase 212.

As shown in FIG. 6, rollers 226 that function as bearings are pasted on an indentation in the crankpin 220 with grease before the big end 224 of the connecting rod 222 is slid into place. The rollers 226 allow pivotal movement between the crankshaft 206 and the connecting rod 222. It should be appreciated that any other suitable bearing means such as spring loaded needle bearings or ball bearings are substitutable for the rollers 226.

The crankshaft 206 is preferably forged as a unitary piece, and has a substantially circular cross-section throughout its length. The crankshaft 206 has a first diameter $D_1$ on the one side of the connection point 225 near the bearing 214 and a second diameter $D_2$ on the other side of the connection point 225 adjacent the balancing web 208. The diameter $D_1$ of the crankshaft 206 near the bearing 214 is less than the diameter $D_2$ near the balancing web 208 so that the big end 224 of the connecting rod 222, including the needle bearings 226, is installable over the tapered upper end of the crankshaft 206 and the arcuate throw 218 until it rests in place around the crankpin 220.

The flywheel 210 includes a fan 227, which together are mounted to the upper end of the crankshaft 206 on the side of the crankpin 220 opposite the balancing web 208. The cooling fan 227 draws air from inlets 228 in shroud 230 and out through outlets 231. To compensate for the lack of a conventional balancing weight on the fan side of the crankshaft 206, a weight 232 is embedded in the flywheel 210, preferably about 180 degrees opposite from the crankpin 220. The weight 232 gives the flywheel 210 a radially offset center of gravity, and acts as a balancing means in the flywheel for balancing the reciprocating inertia and other forces applied to the crankshaft 206 through the connecting rod 222 by the piston 202 to thereby reduce vibration. As an alternative to a weight embedded in the flywheel 210, the flywheel can for example be formed with sections of varying density to achieve the same purpose.

Similarly to the embodiments described above with respect to FIGS. 1 through 4, a wall 234 extends at least partially into the interior of the crankcase 212 to define an oil collection chamber 236. The wall 234 has apertures 238 and 240 through which the oil collection chamber 236 is in communication with the remainder of the crankcase. A cam gear 242 and at least one cam lobe 244 rotatably mounted in conventional fashion on a camshaft 246 splash or sling oil as they rotate, and thereby function as a means for agitating oil in the oil collection chamber 236 so that the oil is conveyed through the apertures 238 and 240 into the crankcase.

The oil agitated in the oil collection chamber 236 also passes through push rod tubes 248 in communication between the oil collection chamber and a rocker box 250. The push rod tubes 248 are positioned generally below the piston 202 and cylinder 204, and house push rods 252 which operatively couple cam followers 254 and rocker arms 256 in well known fashion. The push rod tubes 248 are inclined with respect to a horizontal plane, preferably at least 10 degrees as described above, so that liquified oil may return under the force of gravity from the rocker box 250 to the oil collection chamber 236 in the crankcase 212. A cutting blade 258 is mounted to the lower end of the crankshaft 206, and a recoil starter 260 of the on-off type is located at the reverse side of the crankshaft.

Figure 8:
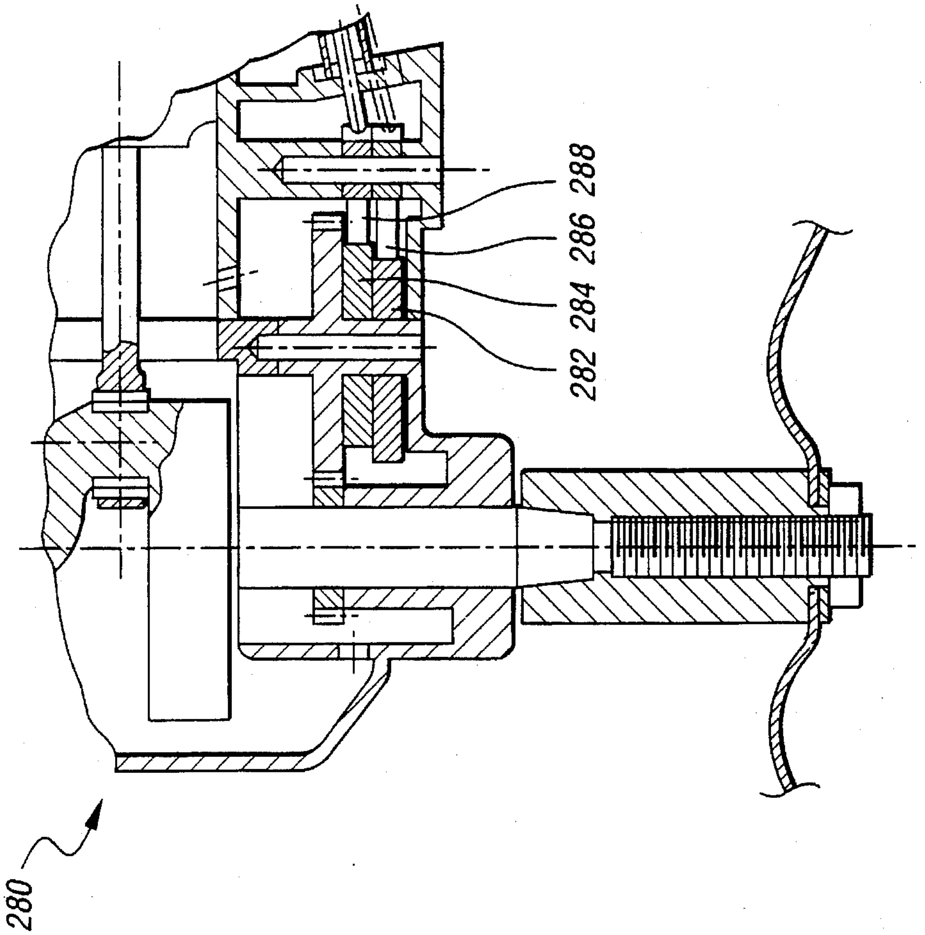
FIG. 8 is a partial cross-sectional view of another alternative embodiment of the internal combustion engine.
Figure 7:
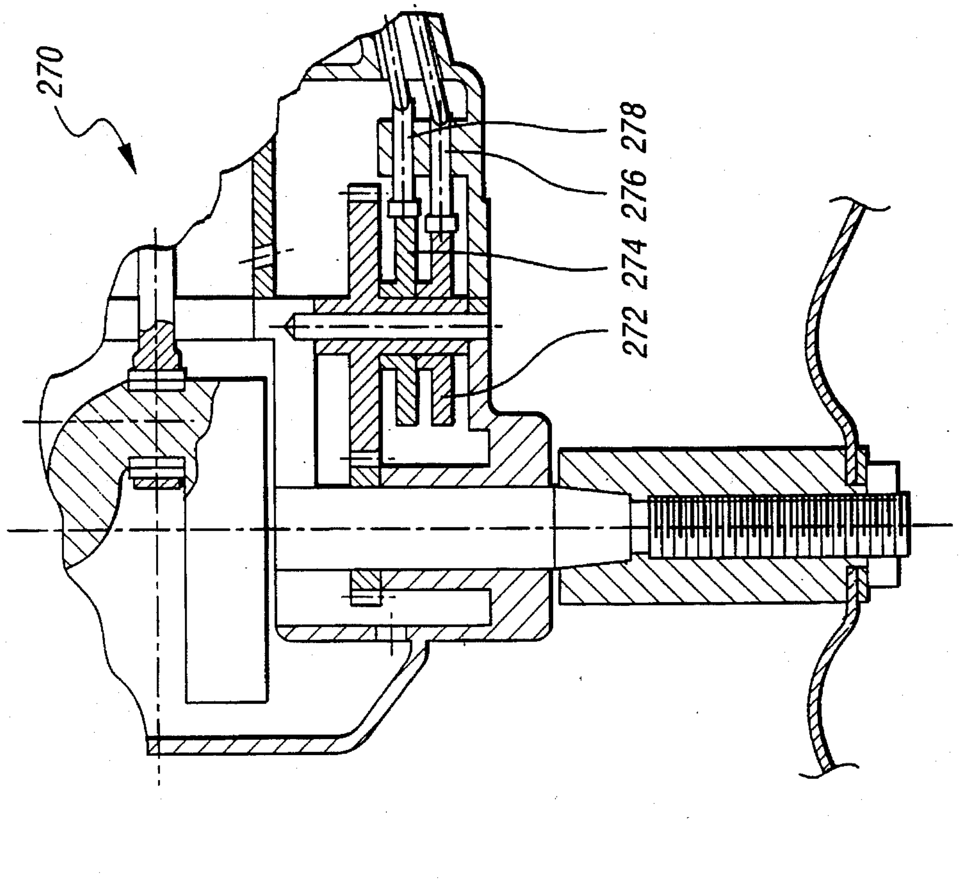
FIG. 7 is a partial cross-sectional view of another alternative embodiment of the internal combustion engine.

FIG. 7 shows another alternative embodiment 270 of the engine which operates in substantially the same manner as the embodiments shown and described above, except that two conventional cams 272 and 274 and corresponding tappets 276 and 278 are substituted for the cam followers shown in FIG. 5. FIG. 8 shows another alternative embodiment 280 of the engine. The engine 280 also operates in substantially the same manner as those previously described, with the exception that two cams 282 and 284 and cam followers 286 and 288 function to translate the rotational movement of the cams to reciprocable movement of the push rods.

Figure 9:
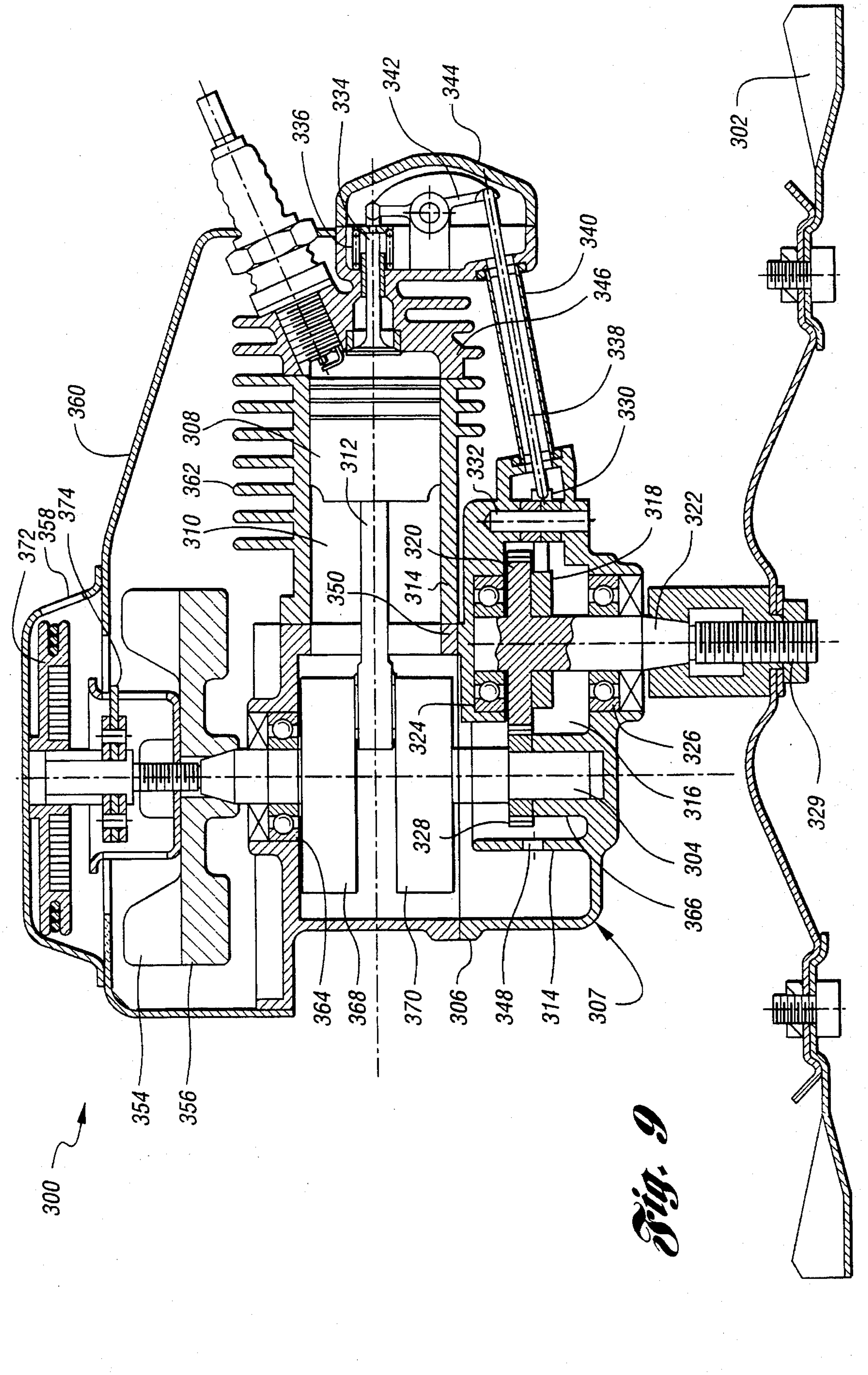
FIG. 9 is a cross-sectional view of another alternative embodiment of the internal combustion engine.

FIG. 9 shows another embodiment 300 of the engine adapted for use with a vegetation cutting device such as a lawn mower having a cutting blade 302, or a line trimmer having some other suitable workpiece. The four cycle engine 300 includes a generally vertically oriented crankshaft 304 rotatable in a crankcase 306 of an engine block 307, and a piston 308 reciprocable in a generally horizontally oriented cylinder 310 of the engine block. The piston 308 is operatively connected to the crankshaft 304 through a connecting rod 312 to impart rotation to the crankshaft, as is well known. A wall 314 extends at least partially into the crankcase 306 to define an oil collection or cam chamber 316.

A single cam lobe 318 and a cam gear 320 are mounted in the oil collection chamber 316 on a camshaft 322, which in turn is journaled to the block 307 by a pair of bearings 324 and 326. The cam gear 320 meshes with and is rotated by a crankgear 328 mounted on the crankshaft 304 to rotate the camshaft 322 at one-half the rate at which the crankshaft rotates. An outer portion 329 of the camshaft 322 extends externally of the block 307, and is adapted to support a workpiece such as the blade 302. A pair of cam followers 330 are pivotably mounted on a follower shaft 332, which extends generally parallel to the camshaft 322 and is preferably fixedly mounted in the crankcase 306. The followers 330 thus pivot on the follower shaft 332 in well known fashion as the cam lobe 318 rotates.

An intake valve 334 and an exhaust valve (not shown) are normally biased to a seated or closed position by springs 336. As the followers 330 pivot on the follower shaft 332, they respectively reciprocate push rods 338 disposed in push rod covers or tubes 340. The push rods 338 extend up to and cooperate with rocker arms 342, which alternately actuate the intake valve 334 and the exhaust valve, respectively, to conventionally supply a fuel-air mixture to the cylinder 310 and to evacuate the byproducts of combustion from the cylinder.

The push rod tubes 340 are positioned generally below the cylinder 310, and are in communication between the oil collection chamber 316 of the crankcase 306 and a rocker box 344 mounted on a cylinder head 346. The push rod tubes 340 are inclined at least about 10 degrees with respect to the horizontal plane, with the end closer to the oil collection chamber 316 being lower than the opposite end adjacent the rocker box 344.

The oil collection chamber 316 functions as a sump into which lubricating oil circulating through the engine 300 drains. The wall 314 which defines the oil collection chamber 316 has at least two apertures 348 and 350 through which the oil collection chamber and the crankcase 306 are in communication. The aperture 350 is preferably angled to direct the oil passing therethrough toward the interface of the connecting rod 312 and the crankshaft 304. The rotating cam lobe 318 and cam gear 320 function as a means for agitating the oil in the oil collection chamber 316 so that an oil mist is created. The oil mist is conveyed through the apertures 348 and 350 into the crankcase 306, with the apertures preferably sized to meter the supply of oil passing therethrough. The oil mist is also conveyed through the push rod tubes 340 into the rocker box 344 to lubricate and cool the valve train and the cylinder head 346. Because the push rod tubes 340 are inclined and located below the cylinder 310 and mostly below the lowermost point in the rocker box 344, the oil returns through the push rod tubes 340 to the oil collection chamber 316 under the force of gravity alone after it liquifies.

A cooling fan 354 is rotatably mounted with a flywheel 356 to the upper end of the crankshaft 304 generally above the cylinder 310. The cooling fan 354 draws air through air inlets 358 in a shroud 360 to pass over cooling fins 362 located around the outside of the cylinder 310 and the cylinder head 346.

The crankshaft 304 is journaled in the crankcase 306 by bearings 364 and 366, and includes two crank webs or balancing weights 368 and 370 mounted on either side of the connecting rod 312. A recoil starter 372 of the on-off type is located at the side of the crankshaft opposite the cutting blade 302. Nail 374 connects with the crankshaft 304 to initially turn over the engine when the starter rope is pulled, and disconnects after the engine is started.

The crankshaft 304 is rotatable by the reciprocable piston 308 at a first rate or speed, preferably in the range of 7200 to 10,000 revolutions per minute (rpm). The camshaft 322 is rotatable by the crankshaft 304, either through the driving connection between the crankgear 328 and the cam gear 332 or some other means such as a belt system, at one half the first rate. For instance, if the design speed of the crankshaft is 7200 rpm, then the camshaft will rotate at about 3600 rpm. The power required to drive the camshaft at this speed is produced in the present invention by a cylinder having only half the volume of a conventional engine which turns the crankshaft at 3600 rpm.

Figure 10:
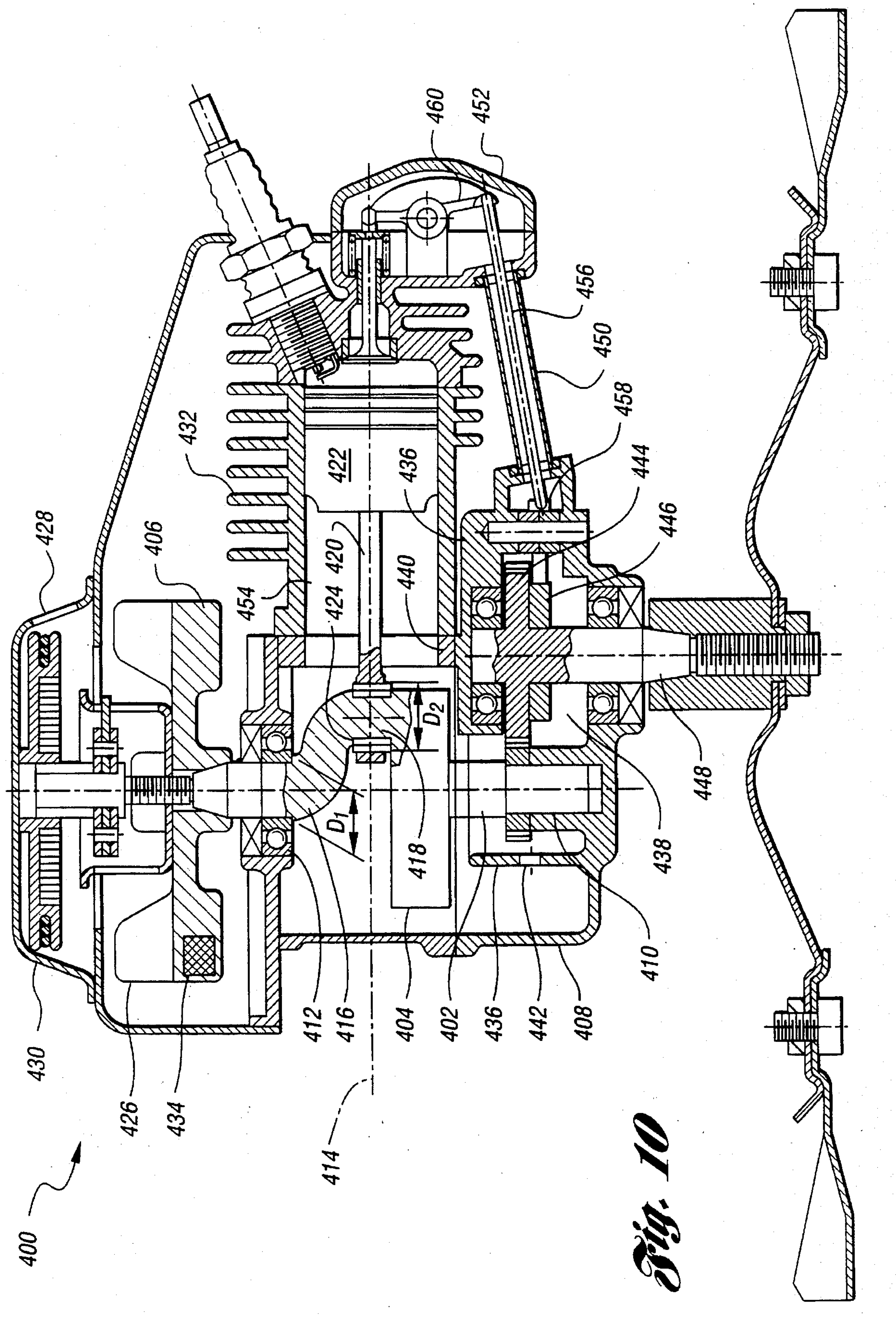
FIG. 10 is a cross-sectional view of another alternative embodiment of the internal combustion engine.

FIG. 10 shows an alternative embodiment 400 of the engine having a generally vertically oriented crankshaft 402 including a single balancing web or counterweight 404, and a flywheel 406 mounted on the upper end of the crankshaft 402. The crankshaft is rotatably mounted in a crankcase 408 by bearings 410 and 412 located on either side of the cylinder axis indicated by the dashed line 414. The crankshaft 402 includes an arcuate throw 416 and a crankpin 418 connected to the balancing weight 404. A connecting rod 420 extending from the piston 422 is operatively connected to the crankpin 418 at a connection point within the crankcase 408. Spring loaded needle bearings 424 are provided in the lower bore of the connecting rod 420 to allow pivotal movement between the crankshaft 402 and the connecting rod 420, but it should be appreciated that any other suitable bearing means such as roller bearings or ball bearings are substitutable for the needle bearings.

The crankshaft 402 is preferably forged as a unitary piece, and has a substantially circular cross-section throughout its length. The crankshaft 402 has a first diameter $D_1$ on the one side of the connection point near the bearing 412 and a second diameter $D_2$ on the other side of the connection point adjacent the balancing web 404. The diameter $D_1$ of the crankshaft near the bearing 412 is less than the diameter $D_2$ near the balancing web 404 so that the lower bore of the connecting rod 420, including the needle bearings 424, can be fit over the tapered upper end of the crankshaft 402 and slid into place.

The flywheel 406 includes a fan 426, which together are mounted to the upper end of the crankshaft on the side of the connection point opposite the balancing web 404. The rotation of the fan 426 draws air through inlets 428 in a shroud 430, and directs the air over cooling fins 432. To compensate for the lack of a conventional balancing weight on the fan side of the crankshaft 402, a weight 434 is embedded in the flywheel 406, as discussed above.

A wall 436 extends at least partially into the crankcase 408 to define an oil collection chamber 438. The wall 436 has apertures 440 and 442 through which the oil collection chamber 438 is in communication with the remainder of the crankcase. A cam gear 444 and at least one cam lobe 446 rotatably mounted in conventional fashion on a camshaft 448 splash or sling oil as they rotate, and thereby function as a means for agitating oil in the oil collection chamber 438 so that the oil is conveyed through the apertures 440 and 442 into the crankcase.

The oil agitated in the oil collection chamber 438 also passes through push rod tubes 450 in communication between the oil collection chamber and a rocker box 452. The push rod tubes 450 are positioned generally below the piston 422 and the cylinder 454 in which the piston is reciprocable, and house push rods 456 which operatively couple cam followers 458 and rocker arms 460 in well known fashion. The push rod tubes 450 are inclined With respect to a horizontal plane, preferably at least 10 degrees as described above, so that liquified oil may return under the force of gravity from the rocker box 452 to the oil collection chamber 438 in the crankcase 408.

It should be understood that the embodiments of the engine shown in FIGS. 9 and 10 can be equipped with two cams and corresponding tappets, as shown in FIGS. 2 and 7 above, or with two cams and corresponding cam followers, as shown in FIGS. 3, 4, 5 and 8 above.

Figure 11:
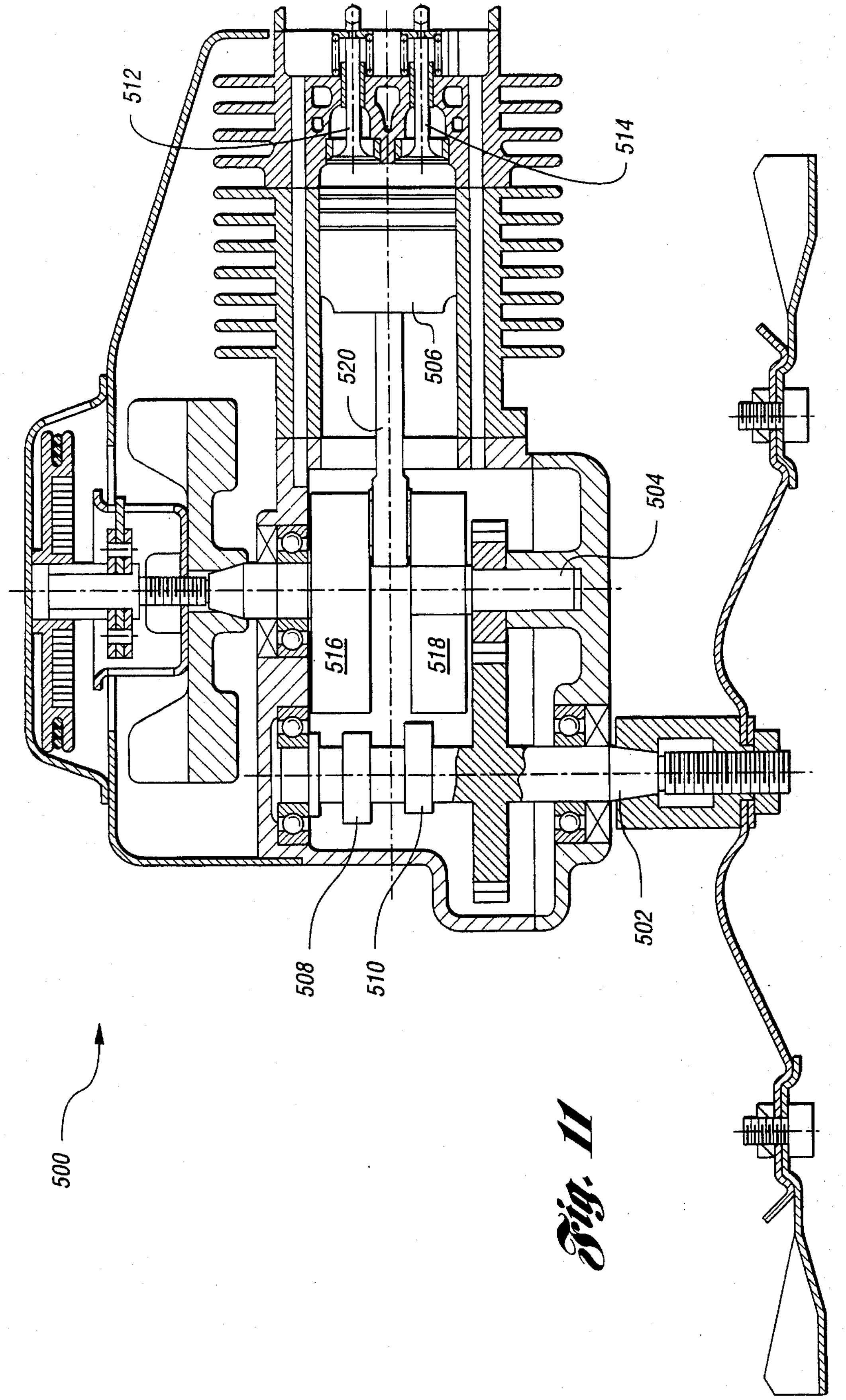
FIG. 11 is a cross-sectional view of another alternative embodiment of the internal combustion engine.

FIG. 11 shows another alternative embodiment 500 of the engine in which the camshaft 502 is located to the side of the crankshaft 504 opposite the piston 506. The camshaft 502 includes cam lobes 508 and 510, which are operatively connected to valves 512 and 514 through any of the mechanisms described above. In this embodiment, the engine 500 is shown having crank webs 516 and 518 on either side of the connecting rod 520.

Figure 12:
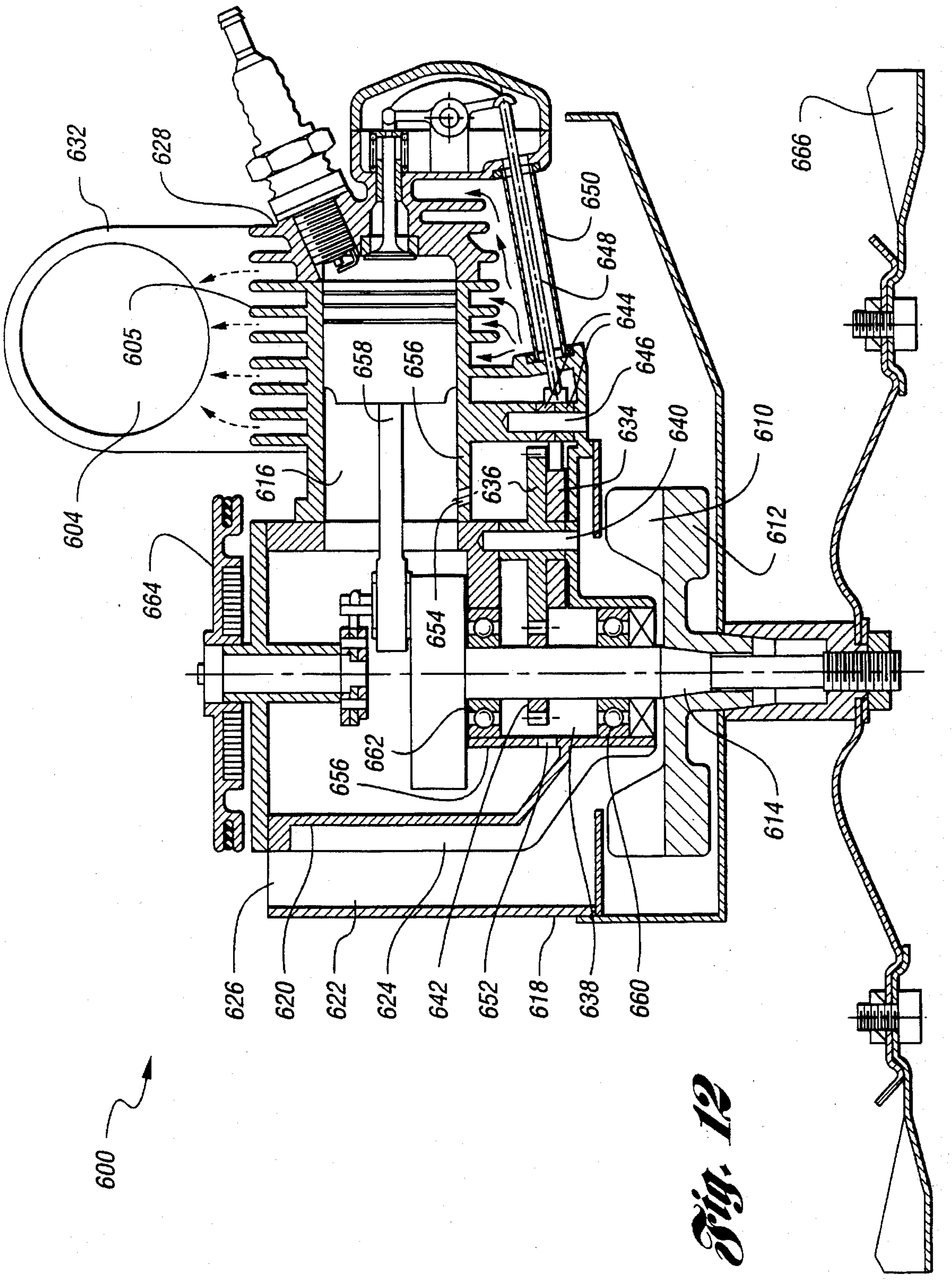
FIG. 12 is a cross-sectional view taken along line 12—12 in FIG. 13 of another alternative embodiment of the internal combustion engine.
Figure 13:
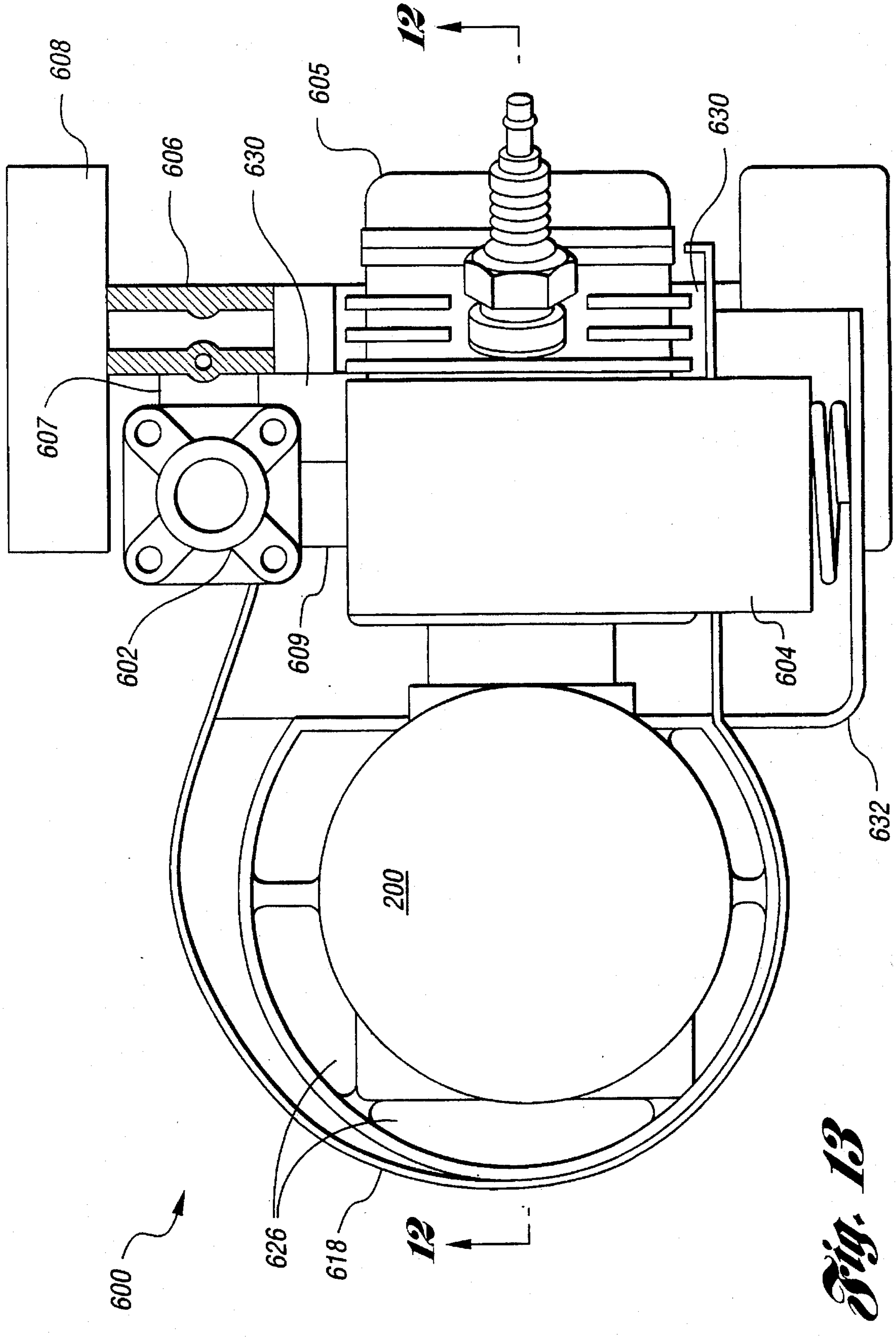
FIG. 13 is a plan view of the embodiment of the internal combustion engine shown in FIG. 12.

FIGS. 12 and 13 show another alternative embodiment 600 of the engine equipped to operate on an alternative fuel, including liquified hydrocarbon or petroleum gases which are subject to vaporization at ambient temperature and pressure. The portable, lightweight four cycle engine 600 is air cooled, and includes a vaporizer or evaporator 602 and a pressurized vessel 604 both mounted adjacent the engine block 605. The vaporizer 602 is in communication with the pressurized vessel 604, which provides a source of the liquid fuel, and with a gas mixer 606 through a fuel flow or volume regulator 607. As shown in FIG. 15, the fuel flow regulator 607 includes a separated room 668 having a gas entrance hole 670. A throttle valve 672 is pivoted on a shaft 674 to open and close a hole 676 adjacent to a gas outlet hole 678. Vessel 680 has a screw 682 that communicates through a compressed spring 684 to produce a force on both a plunger 686 and a distal end of the pivoted valve 672. Gas pressure through the entrance hole 670 against the plunger 686 acts against the spring force, thereby pivotting open the valve 672 a certain degree and controlling the volume of gas that flows out the outlet hole 678 and toward the engine.

Referring again to FIGS. 12 and 13, the mixer 606 is in communication with the outside air through air filter 608. The fuel, preferably either compressed propane, butane, or a mixture of both, is kept in a liquid state in the container 604 under a pressure of about 2–10 kilograms per square centimeter. A pressure regulator 609 integral with the evaporator 602 regulates the flow of the fuel between the pressure vessel 604 and the vaporizer 602. As shown in FIG. 14, fuel from the vessel 604 is lead to an opening adjacent needle valve 688. Closing pressure on the needle valve 688 is produced by regulating spring 690 through pivoted lever 692. The liquid pressure is thus reduced at the needle Valve 688 to facilitate evaporation.

The remaining components of the engine 600 are otherwise substantially similar to the embodiments shown and described above, particularly the embodiment shown in FIG. 1. It should be understood that any of the above embodiments can be equipped with this alternative fuel supply system.

Referring again to FIGS. 12 and 13, a cooling fan 610 is rotatably mounted with a flywheel 612 to the lower end of crankshaft 614 generally below cylinder 616 and adjacent the engine block 605. A housing 618 is at least partially disposed around the crankcase 620 to define an air passage 622 between the housing 618 and cooling fins 624 located around the outside of the crankcase 620. The cooling fan 610 draws air through inlets 626 in the housing 618, and circulates the cooling air over the hot areas of the engine to absorb heat generated by combustion in the cylinder 616. The fan 610 directs the air generally upwardly around the cylinder 616 and cylinder head 628 as shown by the arrows in FIG. 13 to exit through one or more outlets 630.

The vaporizer 602 is mounted on the engine 600 by a bracket 632 adjacent outlet 630 of the passage so that heated air passing through the outlet is directed against the vaporizer and against the pressure vessel 602. When the fuel enters into the vaporzier 602, the pressure of the fuel is reduced to around −20 to +5 millimeters of mercury and the fuel changes to a gaseous state. The heated air directed against the vaporizer 602 and the pressure vessel 604 counteracts the cooling effects of the fuel due its latent heat at vaporization, and in particular helps prevent excessive cooling of the vaporizer 602 which might otherwise cause icing.

The vaporized fuel passes from the vaporizer 602 through the fuel flow regulator 607 into the mixer 606, where the vaporized fuel is mixed with air prior to delivery to the cylinder 616. Thereafter, combustion of the alternative fuel mixture proceeds in well known fashion.

The preferred embodiment of the engine 600 includes a single cam lobe 634 and a cam gear 636 mounted in an oil collection chamber 638 on a camshaft 640. The cam gear 636 meshes with and is rotated by a crankgear 642 mounted on the crankshaft 614. A pair of cam followers 644 pivot on a follower shaft 646 as the cam lobe 634 rotates to reciprocate push rods 648 disposed in inclined push rod tubes 650, as described above.

The rotating cam lobe 634 and cam gear 636 agitate the oil in the oil collection chamber 638, and the resulting oil mist is conveyed through the push rod tubes 650 and through apertures 652 and 654 in wall 656. The aperture 654 is angled to direct the oil passing therethrough toward the interface of the crankshaft 614 and connecting rod 658.

The crankshaft 614 is preferably cantilevered, having a first lower end rotatably supported in bearings 660 and 662, and a second free end which is operatively connected to the connecting rod 658 but is otherwise unsupported. A recoil starter 664 of the on-off type is located at the side of the crankshaft opposite cutting blade 666, and operates as described above.

It should be understood that while the forms of the invention herein shown and described constitute preferred embodiments of the invention, they are not intended to illustrate all possible forms thereof. It should also be understood that the words used are words of description rather than limitation, and various changes may be made without departing from the spirit and scope of the invention disclosed. It should also be understood that various features shown in the embodiments shown and described can be combined in many novel ways, all of which are intended to be within the scope of the following claims.

What is claimed is:

1. A vegetation cutting device comprising:

a four cycle engine including:

a piston reciprocable in a block, a crankshaft rotatable by the piston, and a camshaft journaled to the block and rotatable by the crankshaft at one half the rate of rotation of the crankshaft, the camshaft having an outer portion extending externally of the block; and cutting means driven by the outer portion of the camshaft for cutting vegetation.

2. The vegetation cutting device of claim 1 wherein the crankshaft is oriented generally vertically.

3. The vegetation cutting device of claim 1 wherein the crankshaft is situated at least partially in a crankcase, the crankcase being in communication with a rocker box through a push rod tube.

4. The vegetation cutting device of claim 3 wherein the piston is reciprocable in a generally horizontally oriented cylinder, and the push rod tube is positioned generally below the cylinder.

5. The vegetation cutting device of claim 4 wherein the push rod tube is inclined with respect to a horizontal plane.

6. The vegetation cutting device of claim 5 wherein the push rod tube is inclined at least 10 degrees.

7. The vegetation cutting device of claim 1 further comprising a flywheel mounted to the crankshaft, and balancing means on the flywheel for balancing forces applied to the crankshaft by a connecting rod operatively connected to the crankshaft.

* * * * *